US005189305A

United States Patent [19]

Penglase et al.

[11] Patent Number: 5,189,305

[45] Date of Patent: Feb. 23, 1993

[54] TIMING APPARATUS PARTICULARLY FOR RACING VEHICLES

[75] Inventors: Kim E. Penglase; Jacek Dutkiewicz, both of Bairnsdale, Australia

[73] Assignee: Redback Electronics Pty, Ltd., Bairnsdale, Australia

[21] Appl. No.: 776,225

[22] PCT Filed: May 14, 1990

[86] PCT No.: PCT/AU90/00195

§ 371 Date: Nov. 13, 1991

§ 102(e) Date: Nov. 13, 1991

[87] PCT Pub. No.: WO90/14643

PCT Pub. Date: Nov. 29, 1990

[30] Foreign Application Priority Data

May 15, 1989 [AU] Australia ............................... PI4166

[51] Int. Cl.[5] ............................................ G01C 22/00

[52] U.S. Cl. ................................ 250/338.1; 250/341; 364/569; 368/10

[58] Field of Search ................. 250/338.1, 341; 377/5, 377/9, 20, 24.1, 24.2; 364/569; 368/2, 6, 8, 111, 115, 10; 455/39, 66, 70, 345

[56] References Cited

U.S. PATENT DOCUMENTS

| | | | |
|---|---|---|---|
| 2,978,863 | 4/1961 | Strobel | 368/2 |
| 4,823,367 | 4/1989 | Kreutzfeld | 377/24.2 |
| 5,090,030 | 2/1992 | Jenkins | 377/5 |

FOREIGN PATENT DOCUMENTS

| | | | |
|---|---|---|---|
| 90603/82 | 5/1984 | Australia . | |
| 669687A5 | 3/1989 | Switzerland . | |
| 1193706 | 11/1985 | U.S.S.R. | 377/5 |
| 2117937A | 10/1983 | United Kingdom . | |

*Primary Examiner*—Constantine Hannaher
*Assistant Examiner*—Edward J. Glick
*Attorney, Agent, or Firm*—Lowe, Price, LeBlanc & Becker

[57] ABSTRACT

A timing apparatus for providing timing information to a moving person (11) moving past a datum line (13). A radiation source (15) located at the datum line (13) emits modulated radiation in a diverging conical radiation zone (16) across a path (12) along which the person moves and straddling the datum line (13) across the path (12). A radiation sensor (21) located on an aerial (22) receives radiation emitted by the radiation source (15) as the radiation zone (16) is crossed and generates a sensor signal (21*a*). A radiation detector circuit (26) receives the sensor signal (21*a*) and is tuned to discriminate the modulated radiation from the radiation source (15) and to generate a detector signal (26*a*) for as long as radiation from the radiation source (15) is being received and detected. A calculator circuit (27) calculates a predetermined proportion of the duration of the radiation zone crossing as represented by the duration of the detector signal (26*a*) so as to determine the instant of crossing of the datum line (13) and display means (28) display timing information including the time of crossing of the datum line (13).

6 Claims, 1 Drawing Sheet

TIMING APPARATUS PARTICULARLY FOR RACING VEHICLES

BACKGROUND OF THE INVENTION

1. Field of the Invention

This invention relates to timing apparatus, particularly although not exclusively for use in providing timing information for racing vehicles such as motor cars, go karts, speed boats.

2. Description of the Background Art

Most motor racing is carried at racing circuits where the vehicles must travel around a closed track a certain number of times. The provision of timing information, particularly lap times, to the driver can be most useful to enable the driver to improve or optimise performance. Lap times can be provided to a driver by displays provided at the side of the race track for reading as the driver passes, but this information is frequently delayed in being provided and also the driver may not be able to read the information at the time of passing if his attention is on other events. It has been proposed to display timing information within the vehicle e.g. by relaying timing information by radio to a display provided within the vehicle. However either manual input of data to be transmitted or relatively sophisticated apparatus for discriminating between vehicles may be required for this kind of apparatus.

SUMMARY OF THE INVENTION

It is an object of the present invention to provide a timing apparatus for providing timing information to a person moving past a datum line and which is simple and effective in operation.

It is a preferred object of the present invention to provide such a timing apparatus which is capable of automatically supplying timing information to the moving person as the datum line is passed.

According to the present invention there is provided timing apparatus for providing timing information to a moving person moving past a datum line, the timing apparatus including a radiation source for location at the datum line and for emitting radiation in a diverging radiation zone across a path along which the person moves so that the person crosses the radiation zone, the diverging radiation zone straddling the datum line which extends across the path; and timing means for moving with the person and for providing timing information, the timing means including a radiation sensor for receiving radiation emitted by the radiation source as the radiation zone is crossed and for generating a sensor signal in response to sensing of incident radiation, a radiation detector circuit connected to receive the sensor signal and operative to discriminate radiation from the radiation source and to generate a detector signal for as long as radiation from the radiation source is being received and detected, a calculator circuit coupled to the detector circuit to receive the detector signal and operative to calculate a predetermined proportion of the duration of the radiation zone crossing as represented by the duration of the detector signal so as to thereby determine the instant of crossing of the datum line located within the diverging radiation zone, and display means connected to the calculator circuit and operative to display timing information including the time of crossing of the datum line.

Preferably the radiation source is arranged and operative to emit electromagnetic radiation in a conical pattern across the path.

The radiation source may be arranged in relation to the path so that the datum line is located substantially centrally along a symmetry axis of the diverging radiation zone, the calculator circuit being operative to determine the mid-point of the duration of the detector signal by calculating:

$$Ta = T1 + (T2 - T1)/2$$

where:

Ta is the desired instant of crossing of the datum line,

T1 is the time of commencement of the detector signal, and

T2 is the time of termination of the detector signal.

The radiation source may include a modulator for modulating the emitted radiation, the radiation detector circuit including a receiver which is tuned so as to be responsive only to the characteristics of the modulated radiation.

The calculator circuit may be operative to calculate and the display means may be operative to display one or more of the following items of timing information:

- the time elapsed between the latest two successive crossings of the datum line so as to represent a lap time,
- the times taken for at least two laps as represented by the intervals of time between at least two pairs of successive crossings of the datum line,
- the difference between the current lap time as represented by the time interval between the latest two successive crossings of the datum line and the penultimate lap and/or best lap so as to provide a comparison of the latest lap with the penultimate lap and/or the best lap, and
- the total elapsed time from commencement of the operation of the timing apparatus so as to represent the total time elapsed in a competitive event.

For use in timing of racing motor vehicles or boats, the radiation sensor may be located at the top of an aerial which is elevated above the associated vehicle or boat by a significant distance so as to thereby minimise the chance of the radiation sensor being obscured as the vehicle or boat passes through the radiation zone.

Possible and preferred features of the present invention will now be described with particular reference to the accompanying drawings. However it is to be understood that the features illustrated in and described with reference to the drawings are not to be construed as limiting on the scope of the invention.

BRIEF DESCRIPTION OF THE INVENTION

FIG. 1 shows a schematic plan view of timing apparatus according to a possible embodiment of the present invention in use, and FIG. 2 is a block circuit diagram of apparatus according to the present invention.

DESCRIPTION OF THE PREFERRED EMBODIMENTS

Figure 1:
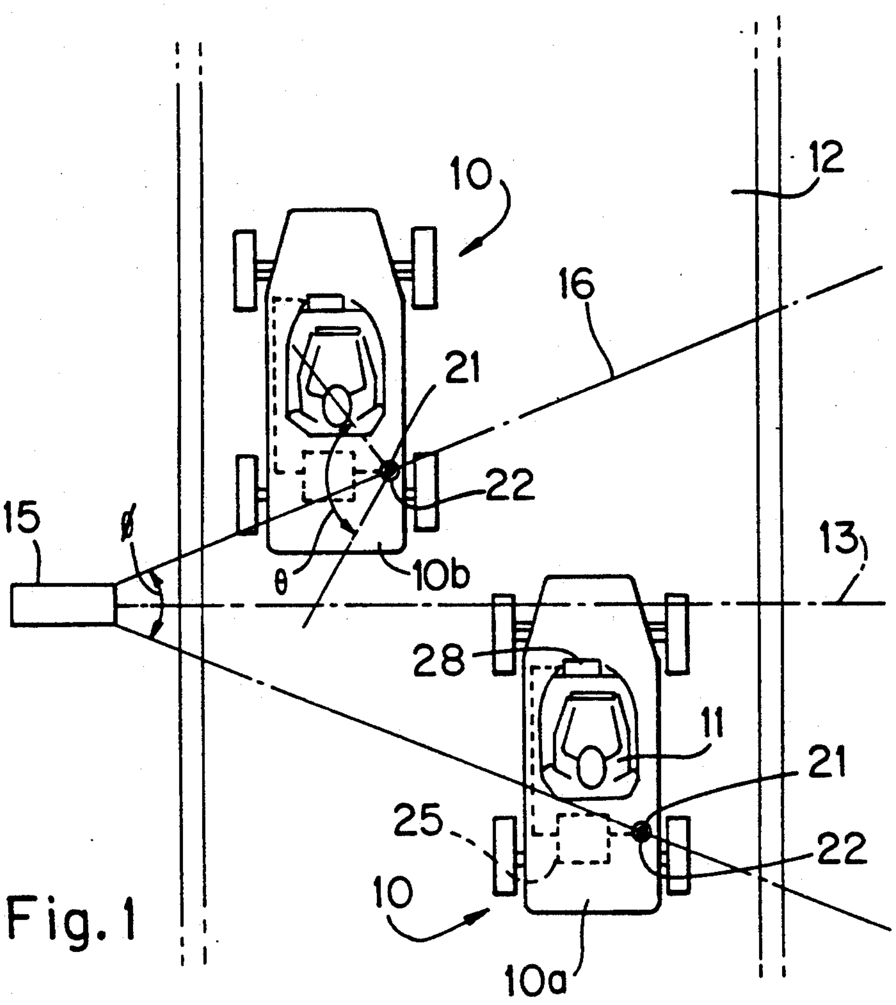

Referring to the drawings, the timing apparatus is for providing timing information to a driver 11 of vehicle 10 travelling along a path 12 such as a race track past datum line 13 which may for example be a start or finish line of the race track. Although the invention will be described for this particular field of use, it will be appreciated that the timing apparatus can be used with other vehicles or even carried personally by an athlete for example.

A radiation source 15 is located at the datum line 13 and emits radiation in a diverging radiation zone 16 across the path 12 so that the vehicle 10 will pass through the zone 16. The zone 16 straddles the datum line 13 and in FIG. 1 the zone 16 is generally conical and the datum line 13 is located centrally along the symmetry axis of the zone 16. However this symmetrical location of the zone 16 relative to the datum line 13 is not essential.

The radiation source 15 is preferably operative to emit electromagnetic radiation such as infrared radiation. The source 15 may comprise for example a number of light emitting diodes (LED's) emitting infrared radiation. The source 15 may comprise a tubular housing with a light transparent end through which the radiation is emitted in the conical pattern. The source 15 may be operated continuously.

Figure 2:
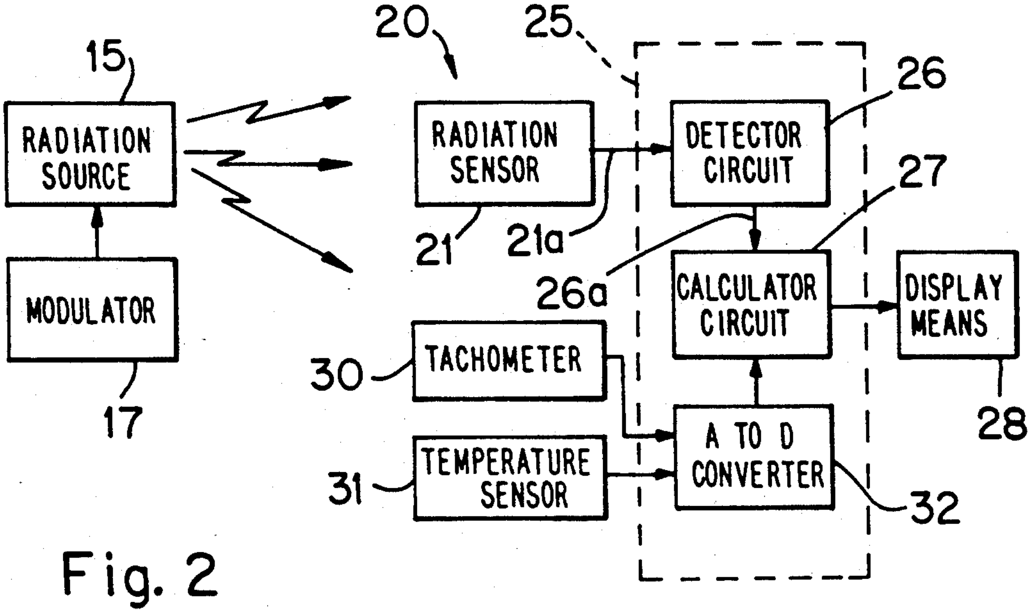

The radiation source includes in FIG. 2 a modulator 17 for modulating the emitted radiation, e.g. by imposing a carrier frequency on the emission of infrared radiation by the LED's.

The timing means 20 moves with the vehicle 10 and includes a radiation sensor 21 for receiving radiation from the source 15 as the radiation zone 16 is crossed. The sensor 21 generates a sensor signal 21*a* in response to sensing of incident radiation. The sensor 21 may be of any convenient construction and operation and for example may comprise photo diodes or photo transistors. The sensor preferably has a sensitivity to incident radiation impinging on the sensor 21 from a wide angle $\theta$ which is greater than the included angle of $\theta$ of the conical zone 16 (FIG. 1) so that the radiation sensor 21 will detect radiation from the source 15 as soon as the sensor 21 first enters the zone 16 (e.g. as shown for vehicle 10*a*) and will continue detecting radiation until the sensor 21 leaves the zone 16 (as shown for vehicle 10*b*).

The sensor is located at the top of an aerial 22 which is elevated above the vehicle 10 by a significant distance so as to minimise the chanoe of the radiation sensor 21 being obscured as the vehicle 10 passes through the zone 16.

The timing means includes processing circuitry 25 which includes a radiation detector circuit 26 connected to receive the sensor signal from the sensor 21 and to discriminate radiation from the source 15 from other radiation and to generate a detector signal 26*a* for as long as radiation from the source 15 is being received and detected. In the case where the source 15 includes a modulator 17, the radiation detector circuit 26 includes a receiver which is tuned so as to be responsive only to the characteristics of the modulated radiation. For example the detector circuit 26 may comprise a superheterodyne amplifier.

The processing circuitry 25 also includes a calculator circuit 27 such as a programmed microprocessor coupled to the detector circuit 26 to receive the detector signal and operative to calculate a predetermined proportion of the duration of crossing of the radiation zone 16. This duration is represented by the duration of the detector signal. In this way the calculator circuit 27 determines the instant of crossing of the datum line 13 located within the diverging radiation zone 16. The output of the calculator circuit is connected to display means 28 so as to display timing information to the driver 11 including the time of crossing of the datum line 13. The display means 28 may comprise for example an LCD display or other suitable display. The display 28 is preferably located in front of the driver 11 so as to be readily seen.

In the case illustrated where the datum line 13 comprises the axis of symmetry of the conical zone 16, the calculator circuit 27 is operative to determine the midpoint of the duration of the detector signal 26*a* by calculating:

$$Ta = T1 + (T2 - T1)/2$$

where:

Ta is the desired instant of crossing of the datum line 13,

T1 is the time of commencement of the detector signal 26*a*, and

T2 is the time of termination of the detector signal.

It will be seen by referring to FIG. 1 that the duration of the detector signal will vary depending on whether a vehicle 10 is crossing the zone 16 nearer to the source 15 or further from the source. However the mid point of the duration of the detector signal 26*a* will remain the instant of crossing of the datum line 13 (assuming constant speed of the vehicle through the zone 16—which will be a valid approximation for most situations). If the datum line 13 is not symmetrically arranged within the zone 16, e.g. if the source 15 is not aligned so as to project across the track 12 with the axis of the conical zone 16 coincident with the datum line 13, the proportion of the duration of the detector signal that is calculated may be selectively varied to accurately represent the instant of crossing of the datum line 13.

The micro processor 27 can be programmed to determine and the display means may be provided with more than one display or may be provided with switching means to enable display of selectively different timing information. For example, the calculator circuit 27 may be programmed to calculate and the display means 28 operative to display one or more of the following items of timing information:

- the time elapsed between the latest two successive crossings of the datum line 13 so as to represent a lap time,
- the times taken for at least two laps as represented by the intervals of time between at least two pairs of successive crossings of the datum line 13,
- the difference between the current lap time as represented by the time interval between the latest two successive crossings of the datum line 13 and the penultimate lap and/or best lap so as to provide a comparison of the latest lap with the penultimate lap and/or the best lap, and
- the total elapsed time from commencement of the operation of the timing apparatus so as to represent the total time elapsed in a competitive event.

The timing information displayed may be selectable as mentioned above by the driver 11 operating push button switches provided on the display 28. For example the previous lap time may be displayed automatically upon the vehicle passing through the zone 16, however by touching a push button switch this display may change to give an indication of whether that last lap time is faster or slower than the penultimate lap time or the best lap time. In this way the driver can monitor performance continuously.

Other information can be displayed if desired. For example, lap number can be readily counted by the micro processor and displayed. By providing other transducers such as tachometer 30 and temperature sensor 31 which are connected to analog to digital converter 32, the micro processor 27 can provide data to the display 28 enabling display of engine speed and cylinder head temperature.

It will be seen that the timing apparatus as described herein and illustrated can be made of simple, cheap and robust components. However the apparatus can be quite accurate in operation.

It is to be understood that various alterations, modifications and/or additions may be made to the features of the possible and preferred embodiment(s) of the invention as herein described without departing from the spirit and scope of the invention.

We claim:

1. A timing apparatus for providing timing information to a moving person moving past a datum line, the timing apparatus including:

a radiation source for location at the datum line and for emitting radiation in a diverging radiation zone across a path along which the person moves so that the person crosses the radiation zone, the diverging radiation zone straddling the datum line which extends across the path; and timing means for moving with the person and for providing timing information, the timing means including:

a radiation sensor for receiving radiation emitted by the radiation source as the radiation zone is crossed and for generating a sensor signal in response to sensing of incident radiation, a radiation detector circuit connected to receive the sensor signal and operative to discriminate radiation from the radiation source and to generate a detector signal for as long as radiation from the radiation source is being received and detected, a calculator circuit coupled to the detector circuit to receive the detector signal and operative to calculate a predetermined proportion of the duration of the radiation zone crossing as represented by the duration of the detector signal so as to thereby determine the instant of crossing of the datum line located within the diverging radiation zone, and display means connected to the calculator circuit and operative to display timing information including the time of crossing of the datum line.

2. A timing apparatus as claimed in claim 1 characterised in that the radiation source is arranged and operative to emit electromagnetic radiation in a conical pattern across the path.

3. A timing apparatus as claimed in claim 1 characterised in that the radiation source is arranged in relation to the path so that the datum line is located substantially centrally along a symmetry axis of the diverging radiation zone, the calculator circuit being operative to determine the mid-point of the duration of the detector signal by calculating:

$$Ta = T1 + (T2 - T1)/2$$

where:

Ta is the desired instant of crossing of the datum line,

T1 is the time of commencement of the detector signal, and

T2 is the time of termination of the detector signal.

4. A timing apparatus as claimed in claim 1 characterised in that the radiation source includes a modulator for modulating the emitted radiation, the radiation detector circuit including a receiver which is tuned so as to be responsive only to the characteristics of the modulated radiation.

5. A timing apparatus as claimed in claim 1 characterised in that the calculator circuit is operative to calculate and the display means is operative to display at least one of the following items of timing information:

the time elapsed between the latest two successive crossings of the datum line so as to represent a lap time, the times taken for at least two laps as represented by the intervals of time between at least two pairs of successive crossings of the datum line, the difference between the current lap time as represented by the time interval between the latest successive crossings of the datum line and the penultimate lap and/or best lap so as to provide a comparison of the latest lap with the penultimate lap and/or the best lap, and the total elapsed time from commencement of the operation of the timing apparatus so as to represent the total time elapsed in a competitive event.

6. A timing apparatus as claimed in claim 1 and for use in timing of racing motor vehicles or boats, characterised in that the radiation sensor is located at the top of an aerial which is elevated above the associated vehicle or boat by a significant distance so as to thereby minimise the chance of the radiation sensor being obscured as the vehicle or boat passes through the radiation zone.

* * * * *